INVENTORS
JACK V. BLYTH
GEORGE F. UPTON

United States Patent Office 3,020,004
Patented Feb. 6, 1962

3,020,004
TURBINE-PROPELLER POWER UNITS
FOR AIRCRAFT
Jack Vallis Blyth, Ewell, and George Frank Upton, Boreham Wood, England, assignors to D. Napier & Son Limited, London, England, a company of Great Britain
Filed Dec. 9, 1958, Ser. No. 779,160
Claims priority, application Great Britain Dec. 12, 1957
2 Claims. (Cl. 244—54)

This invention relates to turbine-propeller, or "turbo-prop" power units for aircraft.

The power turbine of such power units rotates at a considerably higher rotational speed than the propeller, reduction gearing being provided between the power turbine and the propeller. It is usual to build in the whole of the reduction gearing as an integral part of the engine structure.

According to the present invention in a turbo-prop power unit a reduction gearing assembly including auxiliaries is constructed as a unit separate from the engine.

By the engine is meant a structural unit comprising a turbine or turbines, a combustion chamber or chambers, and an air compressor for delivering compressed air to the combustion chamber or chambers for combustion of a fuel therein and the generation of hot gas for driving the turbine or turbines.

The term "auxiliaries" means items of aircraft equipment which require to be driven by the engine. Auxiliaries include pumps, compressors, electric generators, and propeller pitch control units.

One advantage of the invention is that by driving auxiliaries from the separate reduction gearing assembly the drive can be simplified and weight saved, and accessibility of the auxiliaries may be improved. Moreover, the invention affords greater latitude in the relative locations of the engine and the propeller, permitting these to be varied to suit different types of aircraft. In a power unit having the engine and all the reduction gearing constructed as a single unit the longitudinal distance between the propeller hub and the power turbine is fixed. In a power unit embodying the present invention, on the other hand, the longitudinal distance between the propeller and the engine can be varied to suit different types of aircraft merely by employing a transmission shaft of appropriate length between the engine and the separate reduction gearing assembly. Furthermore, if the axis of the input shaft of the reduction gearing assembly is offset from the axis of the output shaft of this assembly, the disposition of the propeller axis in relation to the longitudinal axis of the engine can be varied as desired merely by rotating the reduction gear casing about the axis of the input shaft.

In one form of gas turbine engine suitable for use in a power unit embodying the invention the engine air intake is near the rear of the engine and the propeller-driving power turbine is near the front of the engine. It has been the practice in this form of engine to mount certain auxiliaries at the rear of the engine behind the air intake. In the present invention these auxiliaries are transferred to the separate reduction gearing assembly, thereby substantially reducing the length of the engine behind the air intake, and enabling the engine to be mounted further back and bringing the centre of gravity of the power unit as a whole further back than would otherwise be possible. In certain aircraft this has the further advantage that it brings the air intake of the engine into approximate vertical alignment with air intake ducting in the leading edge of the wing beneath which the power unit is suspended, which simplifies the intake ducting.

The power unit may be mounted in any convenient manner. In one particular installation it is mounted in a ring frame or supporting bulkhead from which the engine and the reduction gearing assembly are supported by separate supporting members, for instance by rigid systems of triangulated struts.

With a rigid mounting of this kind reasonably accurate alignment between the power turbine axis and the axis of the input shaft of the reduction gearing can be achieved, but slight deviations from true alignment can be permitted by introducing some flexibility into a transmission shaft which connects the power turbine and the reduction gearing input shaft.

The invention may be performed in various ways, and one form of aircraft "turbo-prop" power unit embodying the invention will now be described by way of example with reference to the accompanying drawings, in which.

Figure 1:
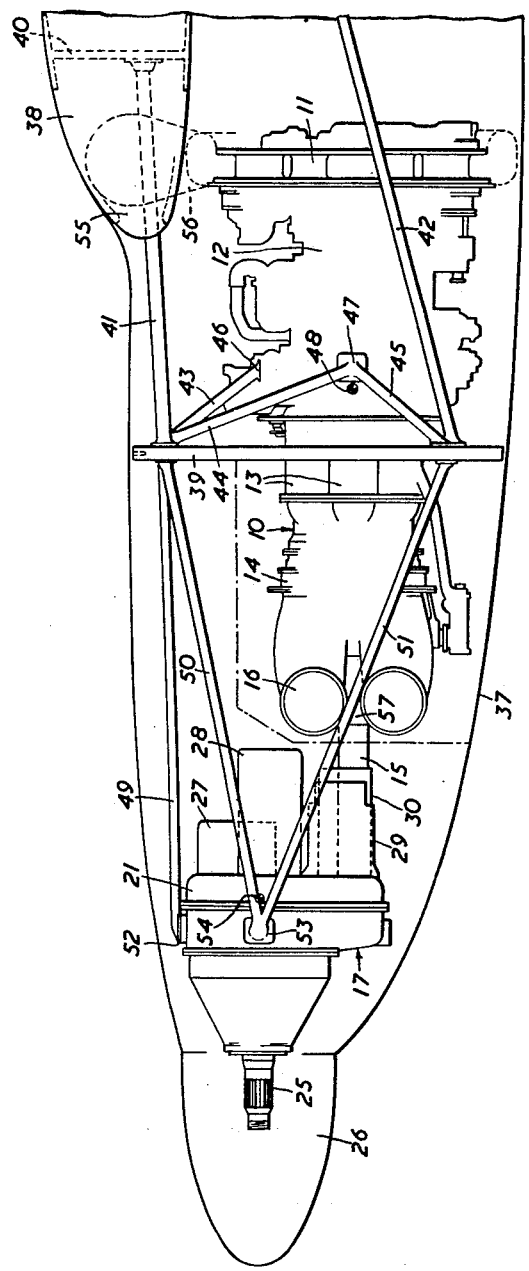
FIGURE 1 is a side elevation of the power unit and its mounting.
Figure 2:
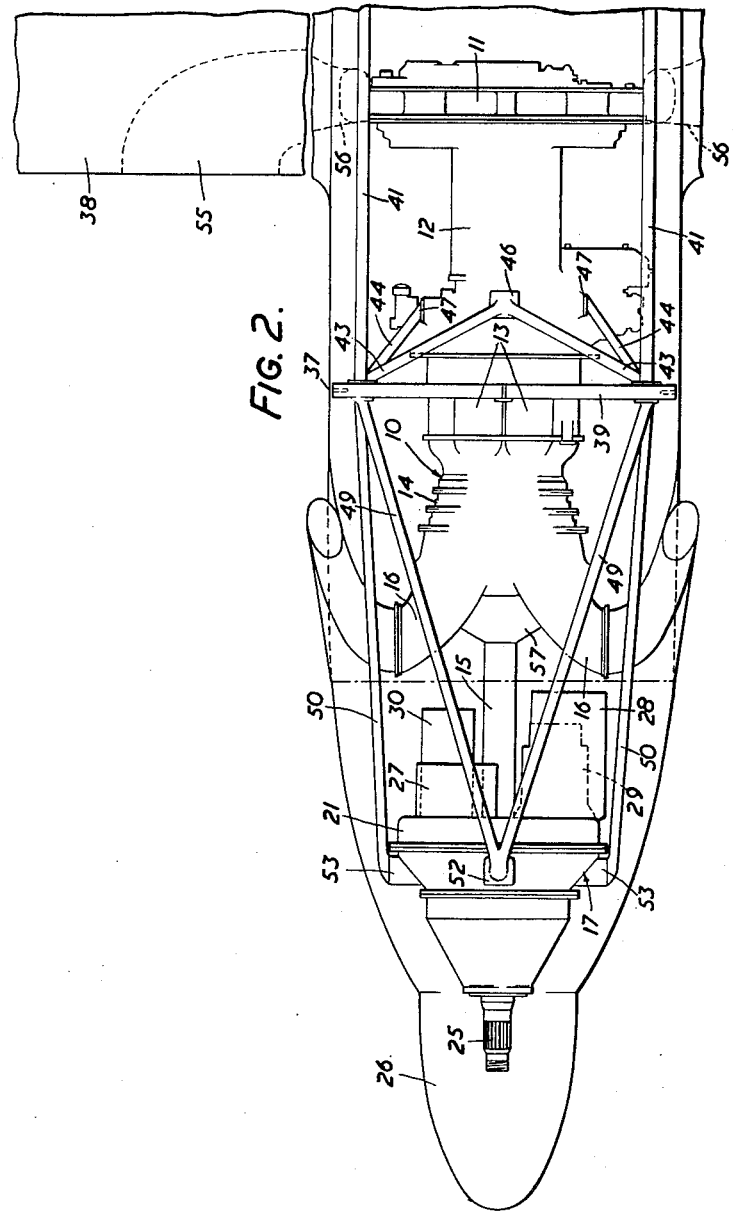
FIGURE 2 is a plan view of the power unit and its mounting.

Referring to the drawings, the power unit comprises an engine 10 having an annular air intake assembly 11 at its rear end, an axial flow compressor 12 disposed in front of the assembly 11, a plurality of combustion chambers 13 extending forwardly between the outlet end of the axial flow compressor 12 and a turbine casing 14, a compressor-driving turbine (not visible in the drawing) contained in the casing 14 and connected to the rotor of the axial flow compressor by a shaft (not visible in the drawing), a power turbine (not visible in the drawing) also contained in the casing 14 downstream of the compressor-driving turbine, exhaust ducting 16 leading away from the front of the turbine casing 14, and a built-in reduction gearing assembly 57 having a reduction ratio of about 6:1. Connected to this gearing is a quill type output shaft 15.

A separate reduction gearing assembly 17 is mounted in front of the engine 10. The reduction gearing assembly 17, which is shown in more detail in FIGURE 3, has an input shaft 18 mounted in bearings 19 and 20 in the casing 21 of the assembly. The input shaft 18 is adapted for easily removable connection to the quill shaft 15, for instance by splines 22. The input shaft 18 carries a spur gear 23 which meshes with a larger spur gear 24 which is rigidly connected to the output shaft 25 of the reduction gear assembly. The output shaft 25 fits into the hub 26 of a propeller.

Figure 3:
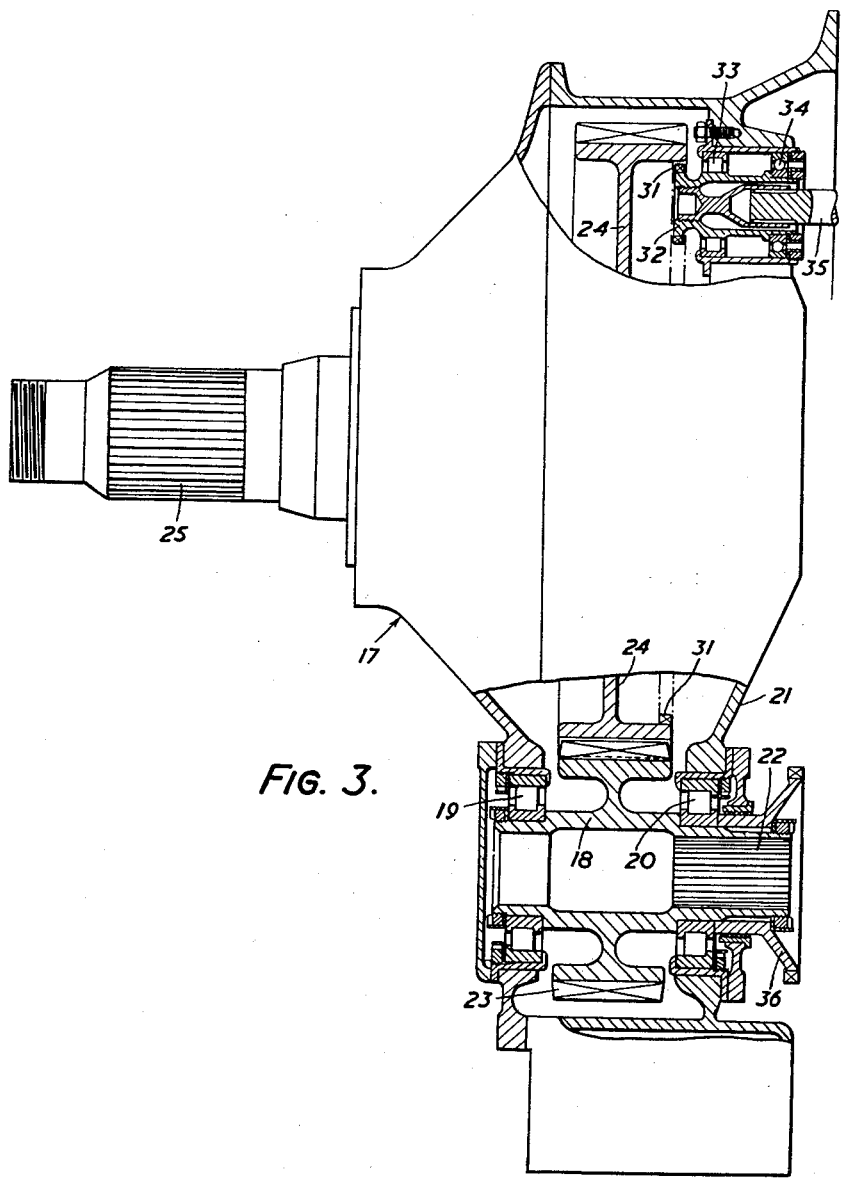
FIGURE 3 is a side elevation of the reduction gearbox on a larger scale, shown partly in section.

Certain items of auxiliary equipment, such as a cabin air blower 27, an electric generator 28, a propeller pitch control governor unit 29 and a hydraulic pump 30, are mounted on the rear of the reduction gear casing 21 where they are more accessible than if they were mounted on the engine 10, for instance behind the air intake assembly 11. Items more suitable for a relatively high speed drive such as the cabin air blower 27 and the electric generator 28 are driven from the spur gear 24 through speed-increasing gearing. This gearing for the cabin air blower 27 is shown in FIGURE 3. The spur gear 24 is provided with an internal ring of gear teeth 31, which teeth mesh with a small gear wheel 32 mounted on bearings 33 and 34 in the casing 21 and splined to the drive shaft 35 of the cabin air blower. An identical drive is provided for the generator 28. Items requiring a somewhat slower drive such as the propeller pitch control governor unit 29 and the hydraulic pump 30 are driven from the input shaft 18 through gears meshing with a gear wheel 36 on this shaft.

The engine 10 and the reduction gear assembly 17 are housed in a nacelle 37 which projects forwards from the wing 38 of the aircraft. The engine is mounted in a ring frame or supporting bulkhead 39 which is attached to the wing main spar 40 by struts 41 and from other suitable parts of the airframe structure by struts 42. The engine is attached to the ring frame 39 by a triangulated frame structure consisting of struts 43 to 45. These struts are attached to mounting pads 46 and 47 on the engine close to the centre of gravity 48 of the engine. The reduction gear assembly 17 is also supported from the ring frame 39 by means of struts 49 to 51 attached to mounting pads 52 and 53 situated on the said assembly close to its centre of gravity 54.

The leading edge of the wing 38 is provided with a forwardly facing air intake 55 from which ducting 56 leads to the vicinity of the engine air inlet assembly 11, the ducting 56 being in approximate vertical alignment with the air inlet assembly 11.

What we claim as our invention and desire to secure by Letters Patent is:

1. A turbine-propeller power unit for aircraft, comprising a first structural unit consisting of an engine comprising an engine casing, at least one turbine, at least one combustion chamber, at least one air compressor, an air intake assembly for said air compressor, a driving connection between said turbine and said air compressor, an output member, and a driving connection between said turbine and said output member; a second structural unit consisting of a reduction gear casing separate from said engine casing, reduction gearing contained within said reduction gear casing, a reduction gearing input member, a propeller shaft, a driving connection between said reduction gearing and said propeller shaft, auxiliary equipment requiring to be driven, means mounting said auxiliary equipment on said reduction gear casing, and driving connections between said reduction gearing and said auxiliary equipment; and shafting connecting said output member of said first structural unit to said reduction gearing input member of said second structural unit; said air intake assembly of said engine being adjacent the rear of said engine, a wing having a leading edge, means suspending said power unit beneath said wing, an air intake in said leading edge of said wing, said air intake assembly of said engine being substantially in vertical alignment with said air intake in said wing, and ducting connecting said air intake in said wing to said air intake in said engine.

2. An aircraft comprising a wing having a leading edge, an air intake in said leading edge, a turbine-propeller power unit comprising a first structural unit consisting of an engine comprising at least one turbine, at least one combustion chamber, at least one air compressor, an air intake assembly for said air compressor disposed in substantial vertical alignment with said air intake in said leading edge of said wing, a driving connection between said turbine and said air compressor, an output member, and a driving connection between said turbine and said output member, and a second structural unit consisting of a reduction gearing assembly, an input member, an output shaft, auxiliary equipment requiring to be driven, and driving connections between said input member and said auxiliary equipment, shafting connecting said output member of said first structural unit to said input member of said second structural unit, a ring frame supporting said power unit, rigid mounting means connecting said first structural unit to said ring frame, separate rigid mounting means connecting said second structural unit to said ring frame, and ducting connecting said air intake in said leading edge of said wing to said air intake assembly of said engine.

References Cited in the file of this patent

UNITED STATES PATENTS

| | | |
|---|---|---|
| 2,457,595 | Orr | Dec. 28, 1948 |
| 2,485,126 | Wood | Oct. 18, 1949 |
| 2,488,783 | Stalker | Nov. 22, 1949 |
| 2,539,960 | Marchant et al. | Jan. 30, 1951 |
| 2,587,649 | Pope | Mar. 4, 1952 |
| 2,718,756 | McDowall | Sept. 27, 1955 |
| 2,912,823 | Lawson | Nov. 17, 1959 |